United States Patent
Spitz et al.

3,798,452
Mar. 19, 1974

[54] IMAGE INTENSIFIERS

[75] Inventors: Erich Spitz; Eugene Leiba; Georges Assouline, all of Paris, France

[73] Assignee: Thomson-CSF, Paris, France

[22] Filed: Oct. 27, 1971

[21] Appl. No.: 192,873

[30] Foreign Application Priority Data
Oct. 30, 1970 France .............................. 70.39259

[52] U.S. Cl. ...... 250/213 R, 350/160 LC, 23/23 LC
[51] Int. Cl. ............................................. H01l 17/00
[58] Field of Search........... 350/160 LC; 250/213 R, 250/213 VT, 331; 23/23 LC; 355/3

[56] References Cited
UNITED STATES PATENTS

| | | | |
|---|---|---|---|
| 3,703,331 | 11/1972 | Goldmacher et al. | 350/160 LC |
| 3,627,408 | 12/1971 | Fergason | 350/160 X |
| 2,892,380 | 6/1959 | Baumann et al. | 250/213 R X |
| 3,663,086 | 5/1972 | Assouline et al. | 350/160 X |

OTHER PUBLICATIONS

Heilmeier et al.: Proc. of the IEEE; Vol. 57; No. 1; Jan., 1969; pp. 34–38.

*Primary Examiner*—Walter Stolwein
*Attorney, Agent, or Firm*—Cushman, Darby & Cushman

[57] ABSTRACT

A storage-type image converter of the photoconductor and liquid crystal kind comprises a photoconductive film arranged beside a film of a mixture of nematic-cholesteric liquid crystals; electrical bias means for successively applying to said films a direct write-in voltage and an alternating erase voltage, an auxiliary light source making it possible to recover the information stored, and stigmatic optical means being provided to project said information on to a viewing screen or on to a photographic substrate or carrier associated with a photocopier.

5 Claims, 3 Drawing Figures

IMAGE INTENSIFIERS

The present invention relates to improved image converter particularly to a liquid crystal image intensifier and recorder, capable to convert an image of low luminous intensity such as for example, the optical information produced on the screen of a cathode ray tube, into a substantially brighter image which can be viewed by large-screen projection or photocopied on a conventional photo-print.

In known devices the optical information, produced on the screen of a cathode ray tube, has be stored, necessarily by photographic means.

It is very difficult to use these means, when the brightness of the image is too low. Moreover, the reproduction of large numbers of photographs is an expensive process.

An object of the present invention is an improved image converter comprising a liquid crystal image intensifier associated with a projection apparatus in which means are provided to allow a very substantial brightness of the projected image.

According to the invention, there is provided an image intensifier comprising in combination; a first and a second transparent electrode, parallel to each other, and between said electrodes, a first photoconductor layer, a second layer of a scattering mixture of a cholesteric liquid crystal and of a nematic liquid crystal, said first and second layers filling the space between said electrodes; means for directing a first light beam onto said first transparent electrode, for forming a pattern of points of non uniform luminosity; an auxiliary light source and means for directing the light emitted by said source onto said second electrode; a screen and means for directing the light incoming from said light source and scattered by said second layer according to said pattern onto said screen; a three position switch having one output, connected to said electrodes, and a first, a second and a third input, for connecting at will to said electrodes, a d.c. voltage and a.c. voltage and a zero voltage.

For a better understanding of the invention and to show how the same may be carried into effect, reference will be made to the drawings accompanying the following description in which:

FIG. 1 schematically illustrates an embodiment of a device according to the invention;

Figure 1:
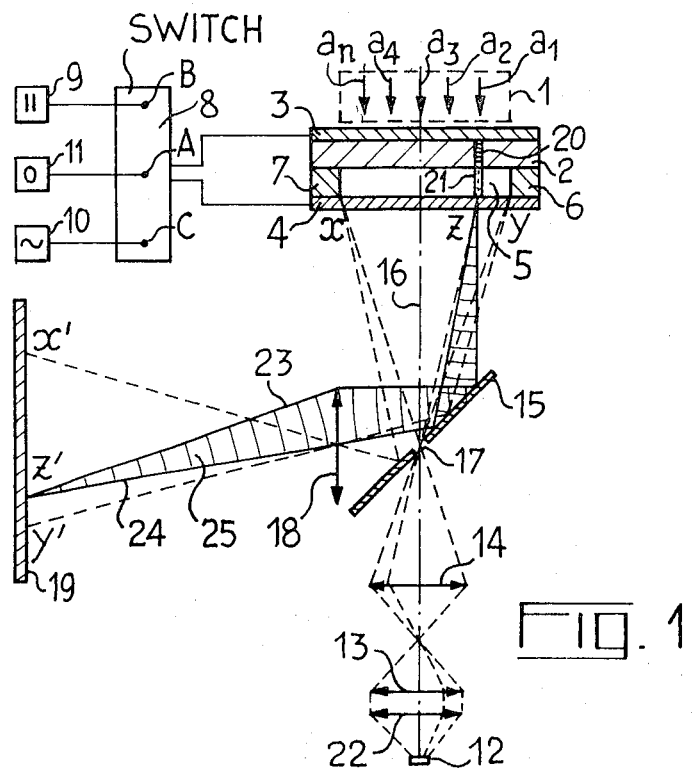

In FIG. 1, a light beam generated a generator 1, which may, for example, be the screen of a cathode ray tube, is illustrated by a number of parallel light rays $a_1$, $a_2$, $a_3$, $a_4$ . . . $a_n$. This radiation beam is directed on to a film 2 of photoconductive material, across a transparent electrode 3. Between the photoconductive film 2 and a second transparent electrode 4, there is a film of liquid crystal 5, whose thickness is maintained constant by means of two spacers 6 and 7. These electrodes are connected to a three position switch which is described thereinafter. I a non-limitative embodiment, the two transparent electrodes 3 and 4 are of tin oxide and the two spacers 6 and 7 are of polytetrafluorethylene, e.g. "Teflon." The capillary attraction is sufficient to hold the film of liquid crystal between the electrode 4 and the photoconductive film 2. The photoconductive material which goes to make up the film 2 is chosen so that its resistivity drops radically under the action of the radiation 1 which is directed on to it from the generator 1. This photoconductor may for example be selenium.

In the Ser. No. 43 427, now abandoned, filed June 4, 1970 by the Applicant the operation of this kind of element, comprising a liquid crystal layer coupled to a photoconductor layer, has been described at length in the case of a nematic liquid crystal. In this case the respective thicknesses of the photoconductive film and crystal liquid layer are selected as a function of the respective resistivities of these materials so that, when the photoconductor is in darkness, the photoconductor receives virtually the whole of the voltage applied between the two transparent electrodes. If a light image is projected on to said photoconductive films, two-dimensional modulation of the resistivity of the photoconductive film takes place, and this is translated, in the liquid crystal film into terms of corresponding variations in the voltage between its faces. To each light beam received by the photoconductor, there corresponds a light scattering area in the nematic liquid crystal. These diffusion area are rendered visible by means of an auxiliary light source which illuminates the liquid crystal.

The remaining area remaining transparent to the light rays. But if the d.c. voltage is maintained the light rays generated by the auxiliary source have for effect to drop the resistivity of the whole semiconductor material, and to destroy the image in the liquid crystal layer. For avoiding this drawback, the film 5 of liquid crystal is constituted by a mixture of a first liquid crystal, in the nematic phase, and a second liquid crystal in the cholesteric phase.

In a non-limitative example, this mixture is made up of between 5 and 10 percent of cholesterol oleate and 85 to 95 percent of MBBA, that is to say Methoxy Benzilidene Butyl Aniline.

Such nematic-cholesteric mixture has the following remarkable property: When receiving a light beam, a d.c. field being applied, the liquid becomes turbulent and scatters light and the material maintains its appearance for quite a long time, after disappearance of the d.c. field.

This phenomenon is described in more detail in a paper by G.H. HEILMEIER and Joël E. GOLDMACHER in "Proceedings of the IEEE" Vol. 57 no 1, Jan. 1969, pages 34 to 38, entitled "A NEW ELECTRIC FIELD CONTROLLED REFLECTIVE OPTICAL STORAGE EFFECT IN MIXED LIQUID CRYSTAL SYSTEM".

The two transparent electrodes 3 and 4 are connected to the three-position switch 8, position B connecting the electrodes to a dc supply 9, position C to an ac supply 10 and position A being a rest position corresponding to disconnecting means 11.

In this latter position, no voltage is therefor applied to the element constituted by photoconductor 2 and liquid crystal 5, so that the liquid crystal 5 remains perfectly transparent.

At an instant $t_o$, The start of the operating cycle, the switch 8 is placed in position B and the electrodes 3 and 4 are thus connected to the d.c. source 9. A voltage of around 100 volts is then applied to the element comprising photoconductor 2 and liquid crystal 5. The thicknesses of the photoconductive film and the liquid crystal film 5, are in the same order of 10 to 20 microns.

The assembly is maintained in the darkness because of the ratio of the resistivities ($10^{12}$ ohm/cm) in the case of the photoconductor and ($10^{10}$ ohm/cm) in the case of the mixture of nematic cholesteric crystals, it follows that the whole of the voltage is across the faces of the photoconductor and the liquid crystal 5 remains transparent.

The system is ready to receive information.

At the instant $t_1$, corresponding to the start of the information write-in phase, the photoconductor is excited by means of the generator 1 which may for example be the screen of a cathode ray tube. For rendering clear the phenomenon the explanation is given for only a ray $a_1$, the explanation remaining valid for the other rays emitted by said generator 1.

The ray $a_1$ passes through the transparent electrode 3 and reaches a zone 20 of the photoconductive film. Consequently, because of the known properties of photoconductors, the resistivity of the film 2 decreases in the zone 20 causing light scattering local area 21, tracing said ray, of the liquid crystal, this area being submitted to an high electric field.

Because of the special composition of the mixture 5 hereinbefore defined and because of the property which said mixture has of retaining its diffusion state, after removal of the voltage, the output image remains visible, and when the bias voltage is removed at the end of the write-in phase, the photoconductor can receive very bright illumination without any modification to the distribution of the scattering aereas in the liquid crystal film. The more light source 12 is brighter, the more image obtained is perceptible. Consequently during the whole of this time, it is possible by illumination of the nematic-cholesteric mixture to exploit the previously stored information and the invention is based upon this very interesting property.

In accordance with one feature of the invention, after the end of the information write-in phase, the direct voltage 9, which has been applied, is disconnected by placing the switch 8 in position A. This switching operation can be carried out automatically, if appropriate control means are provided. The optical information then remains stored by the liquid crystal 5.

During the phase of recovery of the previously stored information, a point light source marked 12 on FIG. 1 and constituted, for example, by a tungsten filament, produces a very bright light beam which is focussed by the condenser 13 and 22 and projected through the lens 14 on to the surface XY of the liquid crystal 5. The paths of the rays coming from the source 12 are indicated schematically in FIG. 1 by broken lines. In the absence of a voltage across the faces of a photoconductor 2, the light rays do not affect the distribution of scattering aerea in the liquid crystal, which has been produced during the storage phase.

The light emerging from the lens 14 illuminates the liquid crystal 5, passing through a hole 17 in a mirror 15 inclined at 45°. The liquid crystal 5 reflects a fraction of the light on to the mirror 15 which transmits it to a lens 18. The lens 18 forms the image of the liquid crystal film 5, on the screen 19.

During the phase of write-in of the optical information hereinbefore described, the zone 21 of the liquid crystal will have become diffusive and since it this state remains after the removal of the direct voltage 9, the light coming from the hole 17 it locally diffused at the point Z whilst around this point it absorbed by the semiconductor.

The diffused fraction of the light energy constitutes a substantial energy flow in the direction of the mirror 15 whilst the rays reflected from around the scattering zone 21, make a negligible contribution to the illumination of the mirror. The only significant luminous flux as far as the illumination of the screen 19 is concerned, is that which passes from the object point Z to the image point Z'; this luminous flux 25 is defined between the full-line rays 23 and 24 which pass via the mirror and the lens 18. The illumination of the screen 19 is thus constituted, at Z', by a light spot which corresponds to the scattering zone of the crystal and stands out against a background whose weak illumination is produced by reflections from the transparent areas of the liquid crystal.

This description applies to all the light beams which excite the photoconductive film 2, and the result is that on the screen 19, there appears the aptical information produced by the generator 1 at any given instant. This information remains on the screen 19 for an appreciable time.

Because the interesting property referred to hereinbefore an image plate of a conventional, commercially available photocopier, can take the place of the screen 19.

In this case, it is possible to copy the image X Y Z in extremely large number.

Moreover, the screen 19 can likewise be a projection screen which gives an observer adequate time to analyse the optical information. This information can be projected on a large scale by means of the lens 18.

Figure 2:
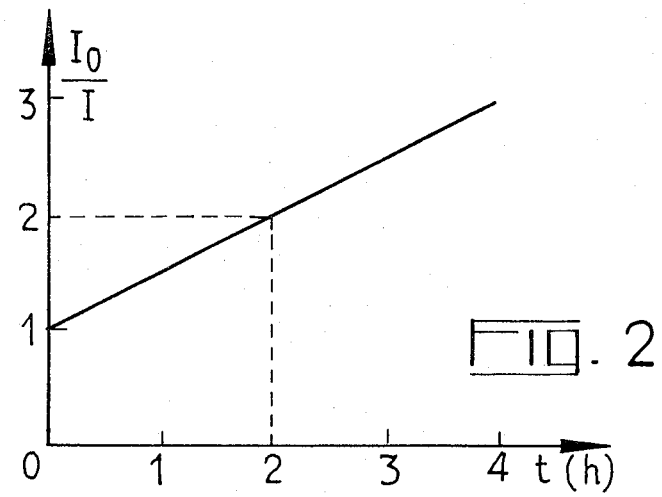
FIG. 2 is an explanatory graph.

FIG. 2 is a graph from which it is possible to determine the life of the stored information. This life is plotted in hours on the X-axis, the origin 0 corresponding to the instant at which the electrical voltage is cut off. The ratio $I_0/I$ is plotted on the Y-axis.

It is the luminous flux diffused by the crystal after a time $t$ and $I_0$ is the luminous flux diffused initially, before the removal of the voltage. This value is taken as equal to 1. An examination of this graph thus shows that two hours after removal of the voltage, the nematic-cholesteric crystal has maintained half its initial diffusion capacity.

When the image has been fully processed, the source 12 ceases to illuminate the liquid crystal 5.

In order to erase the information, the switch 8 is placed in position C and consequently an alternating voltage of around 60 volts r.m.s. at 5Kc/s is thus applied by the source 10 across the electrodes 3 and 4.

As a consequence of another equally remarkable property of the mixed nematic-cholesteric liquid crystal 5, its returns to its initial clear state. The system is ready for a new cycle of operation.

This property of erasing of liquid crystals constituted by a nematic and cholesteric mixture, is described more fully in the aforesaid article by George H. HEILMEIER.

The advantages of the invention will be immediately apparent from the description of the operation of the system shown in FIG. 1 and described hereinabove. An arrangement according to the invention operates as a brightness amplifier, as a recorder of information and as a reproducer of said information in as many copies as required, by conventional photocopying techniques.

Figure 3:
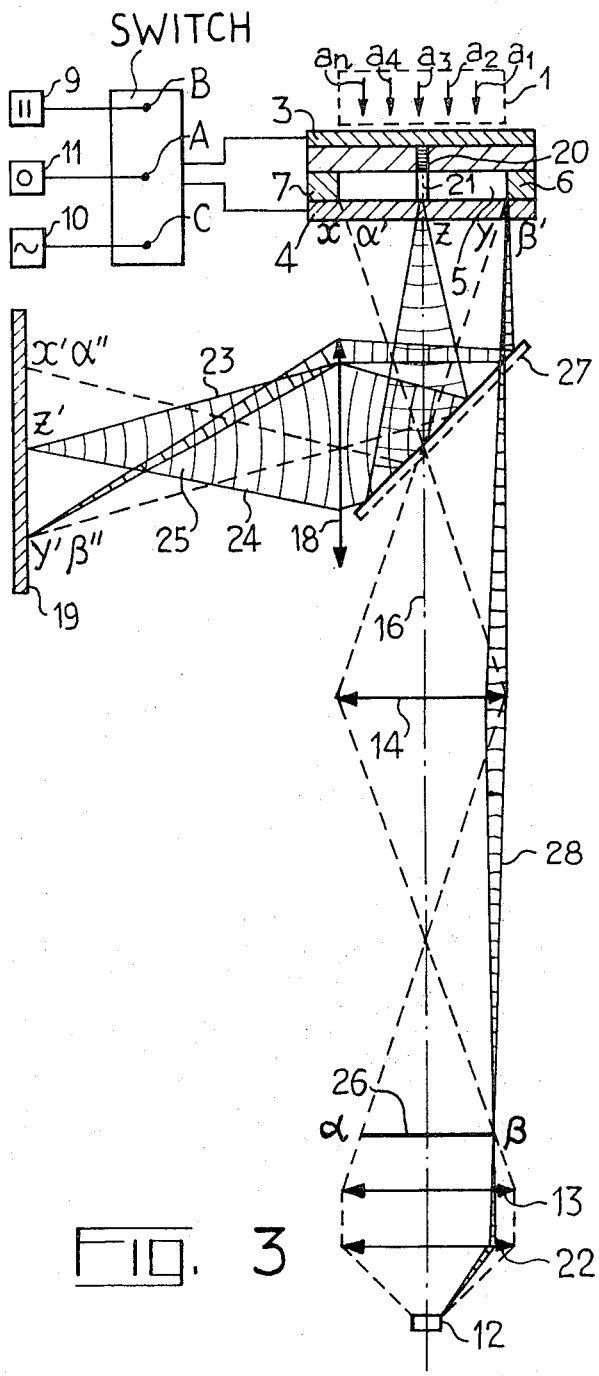
FIG. 3 illustrates a variant embodiment of the device shown in FIG. 1.

A consideration of FIG. 3 will point up another particular advantage, this figure schematically illustrating a variant embodiment of the invention.

Said variant embodiment comprises optical modulating means of non-uniform transparency arranged in the auxiliary light beam between the source of said beam and the optical means for projecting the image of said liquid crystal. Said variant embodiment makes it possible, for example, to superimpose a second optical information, in the form of means of non-uniform transparency introduced into the system, on the first information issued from the generator 1.

In FIG. 3 the same references are used for the elements similar to those of FIG. 1. On this FIG. 3 are provided a radiation generator 1, the element comprising photoconductor 2 and liquid crystal 5, the bias electrodes 3 and 4, the switch 8 and the bias sources 10 and 11. The auxiliary illuminating system likewise comprises the source 12, the condenser 13 and the lens 14, but, in this case, the mirror 27 is a semi-transparent mirror. Means of non-uniform transparency 26 are introduced into the system. The optical system for recovering and processing the information is similar to that described in the case of FIG. 2. A lens 18 projects the image issued from scattering aereas of liquid crystal by means of the mirror 27, on to the screen 19.

The operation of the element, constituted by photoconductor and liquid crystal, is identical to that which has been described in the case of FIG. 1. If means of non-uniform transparency 26 is chosen so that it filters the radiation coming from the source 12, then, just as in the case of FIG. 1, we obtain at X' Y' Z' on the screen 19, the projection of the image X Y Z produced by the liquid crystal. In addition, however, the image $\alpha$, $\beta$ produced by means of non-uniform transparency and appearing at $\alpha'\beta'$ on the liquid crystal, will be projected at $\alpha''\beta''$ on to the screen 19. In other words, the light beam passing through the point $\beta$ of said means 26 is represented in FIG. 3 by the shaded zone 28, and this beam is projected at $\beta'$ by the lens 14 across the semi-transparent mirror 27. The beam 28 is reflected at $\beta'$ on to the mirror 27 and then projected through the lens 18 on to the screen 19 at the point $\beta''$. Thus, on the viewing screen 19 and thus on the image plate of the photocopying machine, the two superimposed informations appear, the first information issuing from the generator 1 and the second information from the means 26. An example of the application of this kind of device might, for example, be that of examining the position of a vehicle represented by a light spot on the screen of a cathode ray tube, in relation to a luminous map recorded on the means of non-uniform transparency.

Self evidently, the examples described are in no way limitative of the scope of the invention.

What we claim is:

1. An image intensifier comprising in combination: a first and a second transparent electrode, parallel to each other, and between said electrodes, a first photoconductor layer, a second layer of a scattering mixture of a cholesteric liquid crystal and of a nematic liquid crystal, said first and second layers filling the space between said electrodes; means for directing a first light beam onto said first transparent electrode, for forming a pattern of points of non uniform luminosity : an auxiliary light source and means for directing the light emitted by said source onto said second electrode ; a screen and means for directing the light incoming from said light source and scattered by said second layer according to said pattern onto said screen ; a three position switch having one output, connected to said electrodes, and a first, a second and a third input, for connecting at will to said electrodes, a d.c. voltage an a.c. voltage and a zero voltage.

2. An image intensifier according to claim 1, wherein said second light source directing means comprise : a condenser, a lens and a slit, said lens focussing inside said slit the light emerging from said condenser, and wherein said scattered light direction means comprise a mirror, located between said lens and said second electrode.

3. An image intensifier as claimed in claim 1, wherein said screen is a large projection screen, a second lens being interposed between said mirror and said screen.

4. An image intensifier as claimed in claim 1, wherein said screen is the plate of a photocopier.

5. An image intensifier, according to claim 1, wherein second light source directing means comprise a condenser, and an optical modulating means, for receiving the light emerging from said condenser, a lens for focussing said modulated light, and wherein said scattered light directing means comprise a semi-transparent mirror, reflecting said scattered light, and transmitting said modulated light.

* * * * *